United States Patent
Ngo

(10) Patent No.: US 10,246,137 B2
(45) Date of Patent: Apr. 2, 2019

(54) TAILGATE WITH A STEP

(71) Applicant: Ford Global Technologies, LLC, Dearborn, MI (US)

(72) Inventor: Tom Thanh Ngo, Troy, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/681,690

(22) Filed: Aug. 21, 2017

(65) Prior Publication Data

US 2019/0054961 A1 Feb. 21, 2019

(51) Int. Cl.
*B60R 3/02* (2006.01)
*B62D 33/027* (2006.01)
*B62D 33/037* (2006.01)

(52) U.S. Cl.
CPC ............ *B62D 33/0273* (2013.01); *B60R 3/02* (2013.01); *B62D 33/037* (2013.01)

(58) Field of Classification Search
CPC ...... B60R 3/02; B62D 33/023; B62D 33/027; B62D 33/0273; B62D 33/03; B62D 33/037
USPC .................................................. 296/57.1, 62
See application file for complete search history.

(56) References Cited

U.S. PATENT DOCUMENTS

| | | | | |
|---|---|---|---|---|
| 6,764,123 B1* | 7/2004 | Bilyard | .................... | B60P 1/435 296/61 |
| 6,905,157 B2* | 6/2005 | Kang | ................. | B62D 33/0273 296/55 |
| 6,966,597 B2* | 11/2005 | Tegtmeier | .......... | B62D 33/0273 296/57.1 |
| 7,232,173 B2 | 6/2007 | Katterloher et al. | | |
| 7,712,811 B2 | 5/2010 | Heaman et al. | | |
| 8,201,869 B1* | 6/2012 | Butlin, Jr. | .......... | B62D 33/0273 296/57.1 |
| 8,348,325 B2* | 1/2013 | Hausler | .............. | B62D 33/0273 296/51 |
| 8,919,853 B2 | 12/2014 | Krishnan et al. | | |
| 9,452,782 B1 | 9/2016 | Singer | | |
| 9,463,746 B2 | 10/2016 | Butlin, Jr. et al. | | |
| 9,522,621 B2 | 12/2016 | Krajenke et al. | | |
| 2002/0070577 A1* | 6/2002 | Pool, III | ................... | B60R 3/02 296/62 |
| 2007/0075560 A1* | 4/2007 | Katterloher | ............... | B60R 3/02 296/50 |
| 2007/0228761 A1* | 10/2007 | Dryja | ........................ | B60R 3/02 296/62 |
| 2008/0042464 A1* | 2/2008 | Hutchins, Jr. | ........... | B60P 1/435 296/61 |

(Continued)

*Primary Examiner* — Gregory A Blankenship
(74) *Attorney, Agent, or Firm* — Carlson, Gaskey & Olds, P.C.

(57) ABSTRACT

An exemplary tailgate assembly includes, among other things, a first gate pivotably coupled to a vehicle body, and a second gate pivotably coupled to the first gate. The second gate has an inner surface that faces a vehicle cargo bed when the second gate is in a closed position. The first and second gates are moveable to a step position where the inner surface is a step surface to the vehicle cargo bed. An exemplary method includes, among other things, pivoting a first and a second gate to a step position where an inner surface of the second gate is a step surface to a vehicle cargo bed. The inner surface faces the vehicle cargo bed when the second gate is in a closed position.

20 Claims, 5 Drawing Sheets

(56) References Cited

U.S. PATENT DOCUMENTS

| | | | |
|---|---|---|---|
| 2016/0075286 A1* | 3/2016 | Butlin, Jr. | B60R 3/02 |
| | | | 296/62 |
| 2017/0291551 A1* | 10/2017 | Krajenke | B62D 33/0273 |
| 2018/0065689 A1* | 3/2018 | Reiners | B62D 33/0273 |
| 2018/0072242 A1* | 3/2018 | Spahn | B60R 11/06 |

* cited by examiner

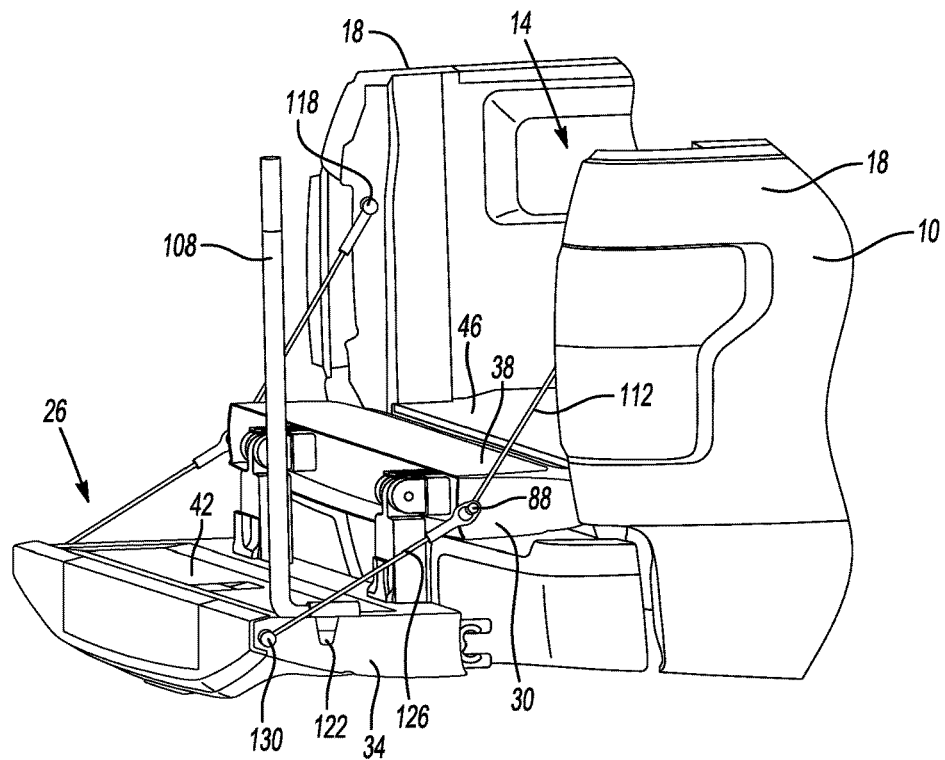
_Fig-3_
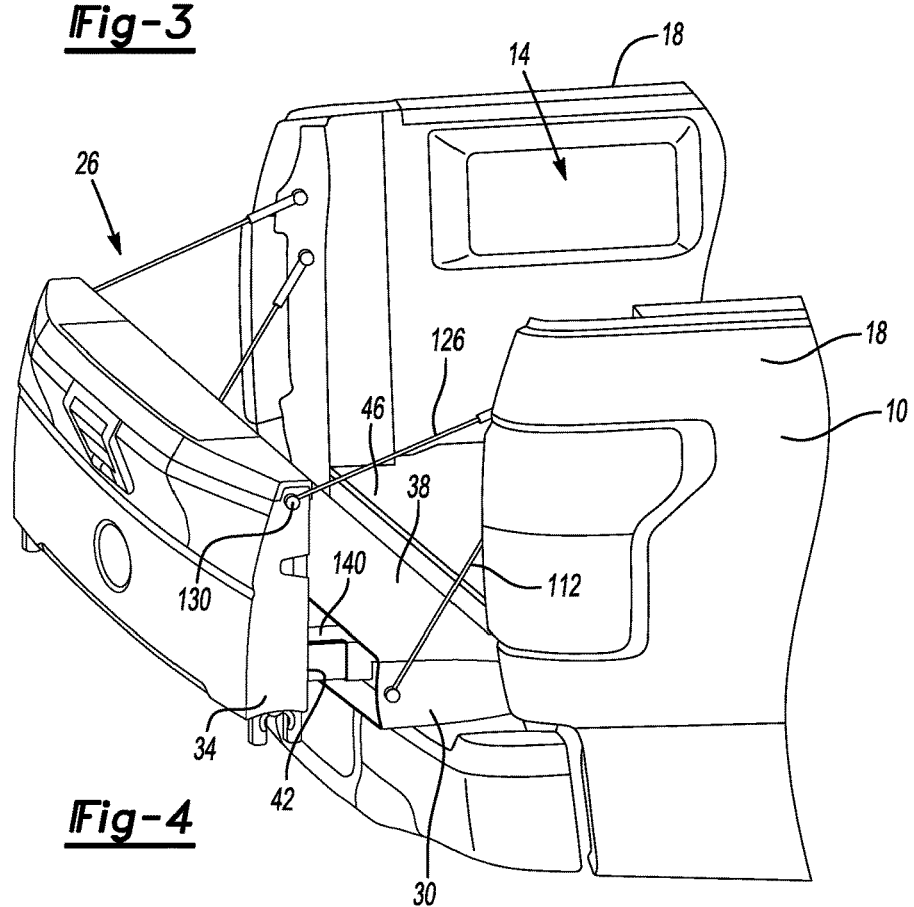
_Fig-4_

TAILGATE WITH A STEP

TECHNICAL FIELD

This disclosure relates to an assembly and method of providing a step to a cargo bed of a vehicle.

BACKGROUND

A vehicle, such as a pickup truck, for example, can include a cargo bed that is used to transport various types of items. The vehicle typically includes a tailgate that encloses one end of the cargo bed. The tailgate can be pivoted to an open position to provide access to the cargo bed. When the tailgate is in the open position, cargo can be removed from, or loaded into, the cargo bed.

The cargo bed is elevated relative to ground level, which can make accessing the cargo bed difficult, even when the tailgate is in the open position. Further, it is often necessary for a user to climb into the cargo bed to access items that are out of reach from outside the cargo bed. Due to the elevation of the cargo bed, ingress and egress can be difficult.

SUMMARY

A tailgate assembly according to an exemplary aspect of the present disclosure includes, among other things, a first gate pivotably coupled to a vehicle body, and a second gate pivotably coupled to the first gate. The second gate has an inner surface that faces a vehicle cargo bed when the second gate is in a closed position. The first and second gates are moveable to a step position where the inner surface is a step surface to the vehicle cargo bed.

In a further non-limiting embodiment of the foregoing assembly, each portion of the first gate is vertically displaced from each portion of the second gate when the first and second gates are in the step position.

In a further non-limiting embodiment of any of the foregoing assemblies, the first gate is in an open position when the first and second gates are in the step position.

A further non-limiting embodiment of any of the foregoing assemblies includes an articulation assembly coupled to the first gate at a first pivot and coupled to the second gate at a second pivot.

In a further non-limiting embodiment of any of the foregoing assemblies, the first pivot is vertically above the second pivot when the first and second gates are in the step position.

In a further non-limiting embodiment of any of the foregoing assemblies, the articulation assembly is configured to pivot relative to the first gate about the first pivot in a first direction to position the second gate in the step position. Also, the second gate is configured to pivot relative to the articulation assembly about the second pivot in a second direction to place the second gate in the step position. The first direction is opposite the second direction.

In a further non-limiting embodiment of any of the foregoing assemblies, when the first gate is in an open position to provide an extended vehicle cargo bed, the articulation assembly is configured to pivot relative to the first gate to a position where the first and the second pivots are substantially vertically aligned, and the second gate is configured to pivot about the second pivot to the closed position to provide a closed tailgate for the extended vehicle cargo bed.

A further non-limiting embodiment of any of the foregoing assemblies includes a first cable assembly coupling the vehicle body to the first gate in the open position, and a second cable assembly coupling the second gate to the vehicle body when the second gate is providing the closed tailgate for the extend vehicle cargo bed.

In a further non-limiting embodiment of any of the foregoing assemblies, the second gate is slideable between an extended position and a retracted position relative to the first gate.

In a further non-limiting embodiment of any of the foregoing assemblies, an interior area of the first gate, the second gate, or both receives at least some of the articulation assembly when the second gate is in the retracted position.

A further non-limiting embodiment of any of the foregoing assemblies includes a latch assembly that is selectively actuated to allow the second gate to transition from the retracted position to the extended position.

In a further non-limiting embodiment of any of the foregoing assemblies, the second gate is pivotable to the step position when the second gate is in the extended position, and the second gate is blocked from pivoting when the second gate is in the retracted position.

In a further non-limiting embodiment of any of the foregoing assemblies, the articulation assembly has a longitudinal axis that extends vertically when the first gate and the second gate are in the step position.

In a further non-limiting embodiment of any of the foregoing assemblies, the first gate and the second gate are disposed along horizontal planes when in the step position.

In a further non-limiting embodiment of any of the foregoing assemblies, the step surface extends across an entire width of the vehicle cargo bed and is generally parallel to ground level when the first and second gates are in the step position.

A method according to an exemplary aspect of the present disclosure includes, among other things, pivoting a first and a second gate to a step position where an inner surface of the second gate is a step surface to a vehicle cargo bed. The inner surface faces the vehicle cargo bed when the second gate is in a closed position.

In a further non-limiting embodiment of the foregoing method, the first gate is pivotably attached to vehicle body, and the second gate is pivotably attached to the first gate through an articulation assembly.

A further non-limiting embodiment of any of the foregoing methods includes moving the second gate to an extended position relative to the articulation assembly and the first gate prior to pivoting the second gate to the step position. The second gate is spaced a distance from the first gate when in the extended position.

In a further non-limiting embodiment of any of the foregoing methods, the articulation assembly includes an articulation arm having a first end portion coupled to the first gate through a first pivot, and an opposing, second end portion is coupled to the second gate through a second pivot. The method further includes pivoting the articulation arm about the first pivot relative to the first gate in a first direction when moving the second gate to the step position, and pivoting the second gate about the second pivot relative to the articulation arm in a second direction when moving the second gate to the step position. The first direction is opposite the second direction.

In a further non-limiting embodiment of any of the foregoing methods, the method includes selectively pivoting the first and second gates to an extended bed position where the first gate is in an open position to provide an extended vehicle cargo bed, and the inner surface of the second gate faces the extended vehicle cargo bed to provide a closed tailgate for the extended vehicle cargo bed.

BRIEF DESCRIPTION OF THE FIGURES

The various features and advantages of the disclosed examples will become apparent to those skilled in the art from the detailed description. The figures that accompany the detailed description can be briefly described as follows:

FIG. 3 illustrates the tailgate assembly of FIG. 1 with the first gate and the second gate in a step position.

FIG. 4 illustrates the tailgate assembly of FIG. 1 with the first gate and the second gate in an extended bed position.

DETAILED DESCRIPTION

This disclosure details exemplary assemblies and methods of providing a step surface to a vehicle cargo bed using a tailgate assembly having a first gate and a second gate. The first gate pivotably connects to a vehicle body, and the second gate pivotably connects to the second gate. These and other features are discussed in greater detail in the following paragraphs of this detailed description.

Figure 1:
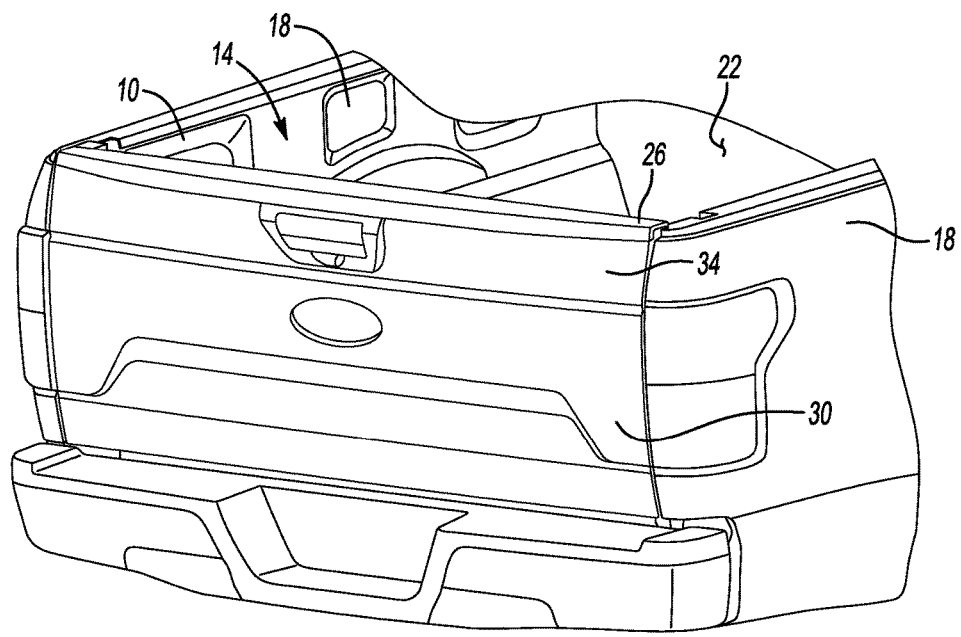
FIG. 1 illustrates a perspective view of a rear of a pick-up truck with a tailgate assembly having a first gate and a second gate in closed positions.

FIG. 1 illustrates a pick-up truck 10 having a cargo bed 14 that is defined between a pair of sidewalls 18, a front wall 22, and a tailgate assembly 26. The tailgate assembly 26 includes a first gate 30 pivotably coupled to a body of the truck 10 at a rear end of the cargo bed 14, and a second gate 34 pivotably coupled to the first gate 30. Although described in connection with the truck 10, the tailgate assembly 26 could be used in connection with other types of vehicles incorporating a tailgate assembly.

Figure 2:
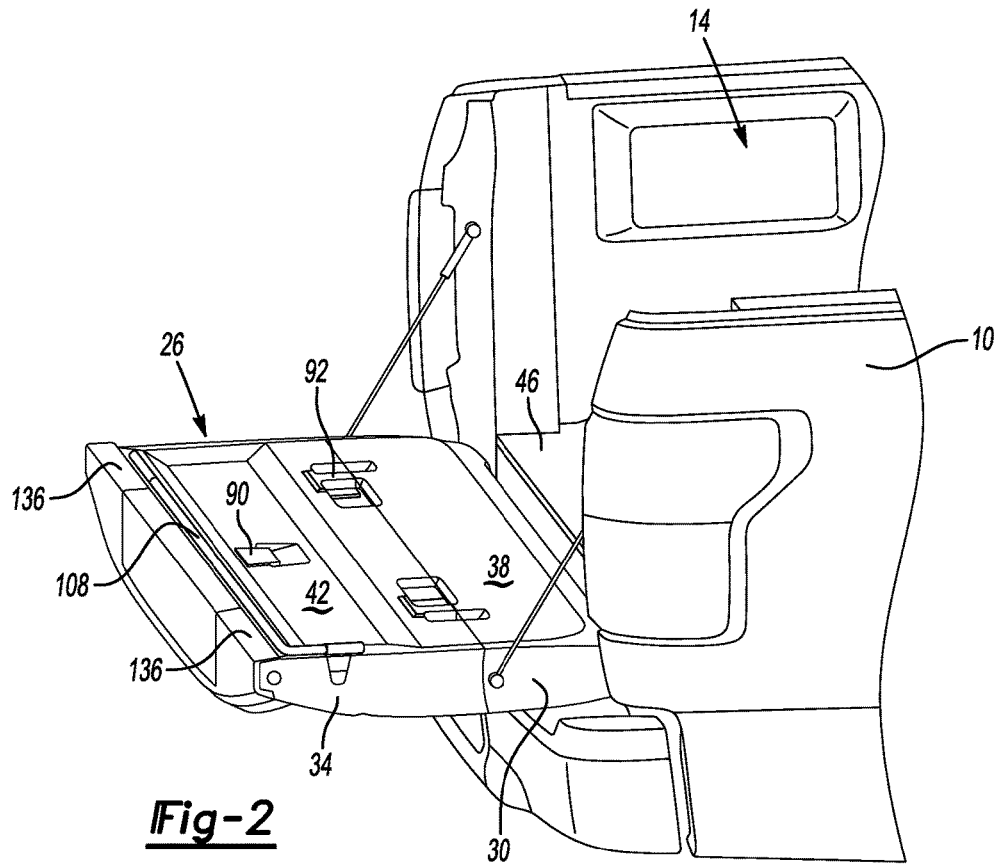
FIG. 2 illustrates the tailgate assembly of FIG. 1 with the first gate and the second gate in open positions.

In FIG. 1, the first gate 30 and the second gate 34 are in closed positions. The first gate 30 and second gate 34 are movable from the closed positions to the open positions as shown in FIG. 2. The first gate 30 and second gate 34 are also moveable to a step position as shown in FIG. 3, and an extended bed position as shown in FIG. 4.

The first gate 30 includes an inner surface 38. The second gate 34 includes an inner surface 42. When the first gate 30 and the second gate 34 are in the closed positions of FIG. 1, the inner surface 38 of the first gate 30 and the inner surface 42 of the second gate 34 face the cargo bed 14. That is, when in the closed positions lines that extending generally perpendicular to a plane of the inner surface 38 and the plane of the inner surface 42 extend toward an area of the cargo bed 14 when the first gate 30 and the second gate 34 are in the closed positions.

When the first gate 30 and the second gate 34 are in the open position of FIG. 2, the inner surface 38 of the first gate 30 and the inner surface 42 of the second gate 34 both face vertically upward. That is, when in the open positions, lines that extending generally perpendicular to the plane of the inner surface 38 and the plane of the inner surface 42 extend vertically upward. For purposes of this disclosure, vertical is with reference to ground and a normal orientation of the truck 10 during operation when being driven or parked. As can be appreciated, when in the open positions of FIG. 2, the inner surfaces 38 and 42 are both disposed along a generally horizontal plane and are aligned with a plane of a floor 46 of the cargo bed 14.

When the tailgate assembly 26 is in the step position of FIG. 3, the inner surface 38 of the first gate 30 and the inner surface 42 of the second gate 34 both face vertically upward, and the inner surface 42 of the second gate 34 is vertically below the inner surface 38 of the first gate 30. When in the step position, the inner surface 42 of the second gate 34 provides a step surface to the cargo bed 14. The step surface extends across an entire cross-vehicle width of the cargo bed 14 and is generally parallel to ground when the first and second gates are pivoted to the step position. A user, wishing to access the cargo bed 14, can utilize the step surface provided by the inner surface 42 as a first step when climbing into and out of the cargo bed 14. The inner surface 38 of the first gate 30 can be used as a second step for the user to climb in and out of the cargo bed 14.

When the tailgate assembly 26 is in the extended bed position of FIG. 4, the second gate 34 is pivoted to the closed position where the inner surface 42 of the second gate 34 faces the cargo bed 14. The first gate 30, however, is in an open position where the inner surface 38 of the first gate 30 faces vertically upward and is generally aligned with the plane of the floor 46 of the cargo bed 14. When in the extended bed position, the first gate 30 effectively extends the length of the cargo bed 14 further rearward, and the second gate 34 provides a closed tailgate for the extended cargo bed.

Figure 5:
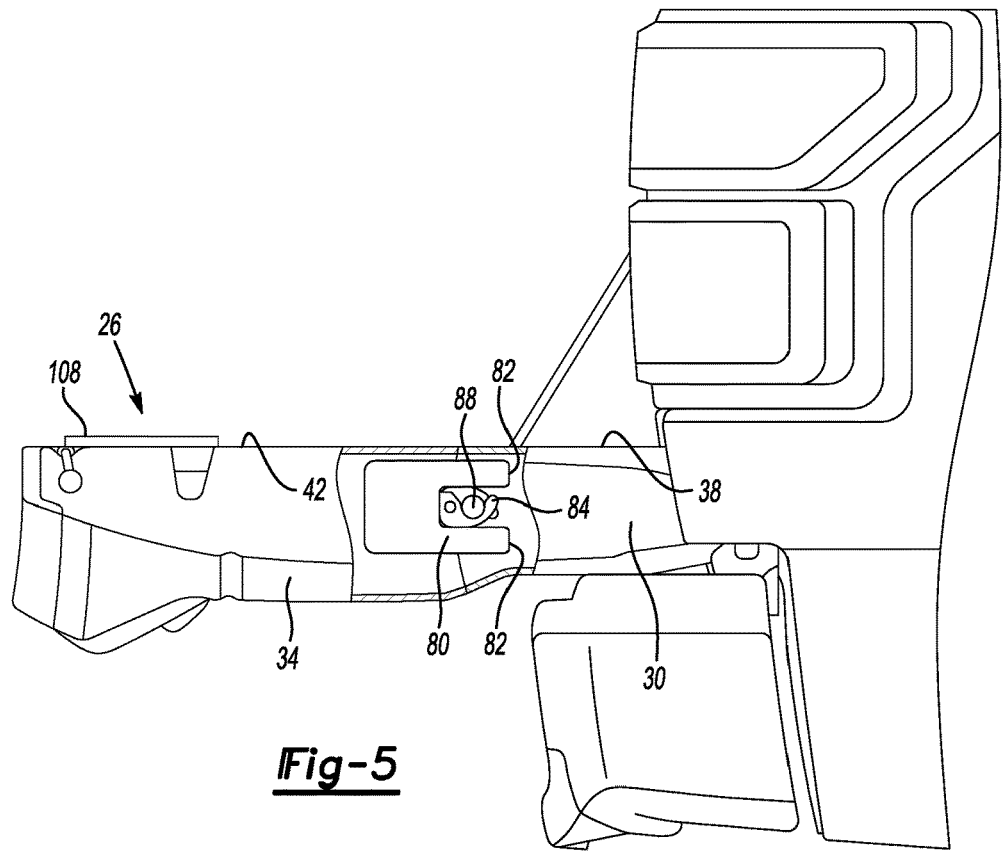
FIG. 5 illustrates a side view of the tailgate assembly from FIG. 2 with selected portions removed to show a portion of a latch assembly.
Figure 6:
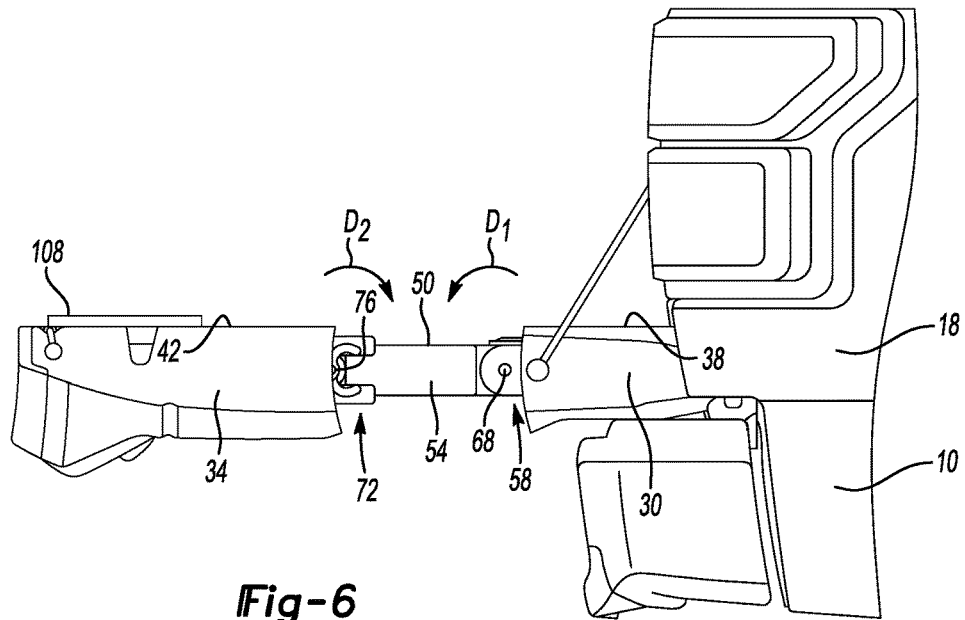
FIG. 6 illustrates a side view of the tailgate assembly of FIG. 2 with the second gate transitioned to an extended position relative to the first gate.
Figure 7:
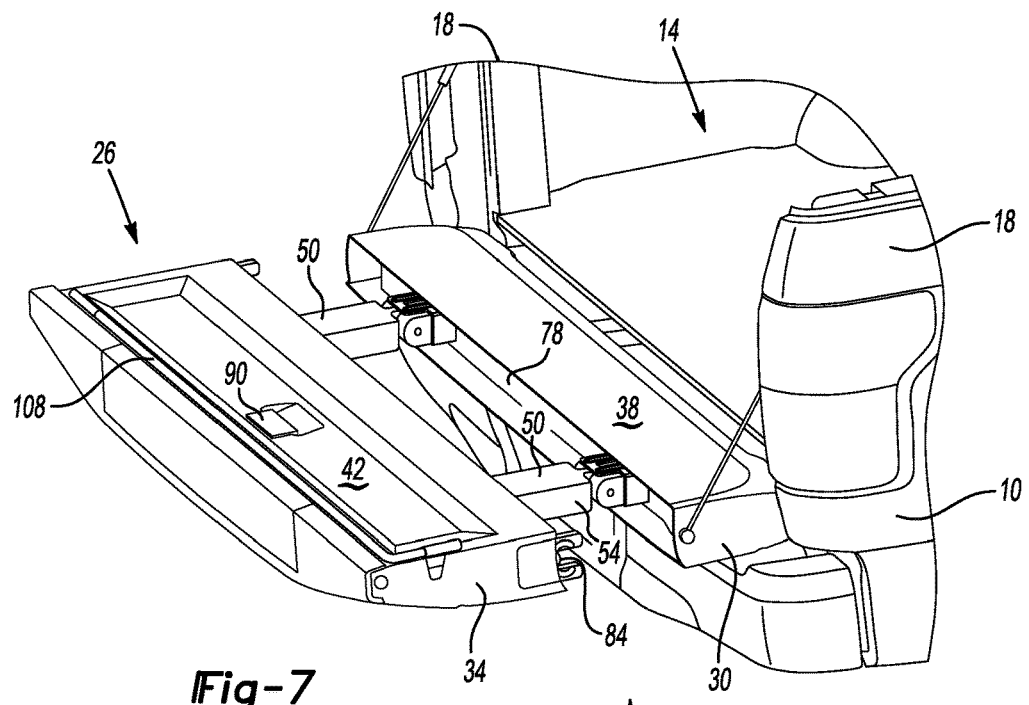
FIG. 7 illustrates a perspective view of the tailgate assembly in the position of FIG. 6.

Referring now to FIGS. 5-8 with continuing reference to FIG. 3, the second gate 34 is slideable relative to the first gate 30 between a retracted position, and an extended position. In this example, FIG. 5 shows a fully retracted position, and FIGS. 6 and 7 show a fully extended position. In this exemplary embodiment, the first gate 30 and the second gate 34 interface directly with each other when in the fully retracted position. When in the extended position, the first gate 30 is spaced a distance from the second gate 34. Notably, the second gate 34 could be extended to extended positions where the second gate 34 is not fully extended relative to the first gate 30.

The tailgate assembly 26, in this exemplary non-limiting embodiment, includes an articulation assembly 50 utilized to pivotably connect the second gate 34 to the first gate 30, and to permit movement of the second gate 34 back and forth between the extended and retracted positions. The articulation assembly 50 connects the second gate 34 to the first gate 30 while permitting manipulation of the tailgate assembly 26 to and from the various positions of FIGS. 1-4.

Figure 8:
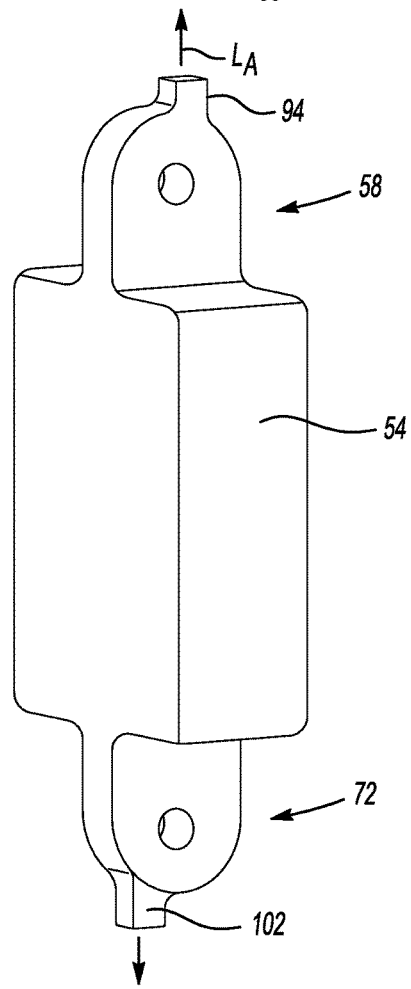
FIG. 8 illustrates a perspective view of an articulation arm from an articulation assembly of the tailgate assembly of FIG. 1.

With reference to FIGS. 6-8, the articulation assembly 50, in this example, includes a pair of articulation arms 54. Other numbers of articulation arms 54 could be used in other examples.

Each articulation arm 54 includes a first end portion 58 pivotably connected to the first gate 30 at a first pivot 68, and a second end portion 72 pivotably connected to the second gate 34 at a second pivot 76.

When the second gate 34 is in a retracted position, at least a portion of the articulation arm 54 is received within an interior area of the first gate 30, an interior area of the second gate 34, or both. In this example, when the second gate 34 is in the fully retracted position of FIG. 5, the articulation arm 54 is entirely received within the interior areas.

The interior area of the first gate 30 and the second gate 34 can include baffle support brackets, such as a baffle support bracket 78 shown within the interior area of the first gate 30 (FIG. 7). The baffle support bracket 78 can block contaminants from entering the interior area, strengthen the first gate 30, or both.

In this exemplary embodiment, the second gate 34 is in the fully retracted position when the first gate 30 and the second gate 34 are in the closed positions of FIG. 1, and the open positions of FIG. 2. A latch assembly 80 (FIG. 5) is used to hold the second gate 34 in the fully retracted position. The latch assembly 80 includes a claw structure 84 that grasps a latch pin 88 to hold the second gate 34 in the retracted position. Prongs 82 of the latch assembly 80 can help guide the claw structure 84 over the latch pin 88 when moving the second gate 34 to the retracted position. The claw structure 84 of FIG. 5 is a passenger side claw structure. The tailgate assembly 26 can include an additional claw structure on the driver side, or in other areas as required.

To move the second gate 34 to the extended position, a user actuates a latch handle 90, which, in this example, pulls cables (not shown) to open the claw structure 84 from around the latch pin 88. A person having skill in this art and the benefit of this disclosure would understand how to actuate a claw by pulling a cable with a handle, and other techniques for actuating the claw structure 84. With the claw structure 84 opened, the user can then slide the second gate 34 from the fully retracted position of FIG. 5 to an extended position, such as the extended position of FIG. 6.

Moving the second gate 34 to the extended position of FIG. 6 provides clearance for pivoting of the articulation arm 54 relative to the first gate 30 about the first pivot 68, and pivoting of the second gate 34 relative to the articulation arms 54 about the second pivot 76. That is, when the second gate 34 is in the extended position of FIG. 6, the articulation assembly 50 and the second gate 34 can be pivoted to the step position of FIG. 3.

When moving the tailgate assembly 26 from the position of FIG. 6 to the step position of FIG. 3, the articulation arm 54 pivots relative to the first gate 30 about the first pivot 68 in a first direction $D_1$. When moving the tailgate assembly 26 from the position of FIG. 6 to the step position of FIG. 3, the second gate 34 pivots relative to the articulation arm 54 about the second pivot 76 in a direction $D_2$. The direction $D_1$ is opposite the direction $D_2$. In this example, the articulation arm 54 pivots ninety degrees about the first pivot 68, and the second gate 34 pivots ninety degrees about the second pivot 76 when moving from the position FIG. 6 to the position of FIG. 3. The first pivot 68 and the second pivot 76 are vertically aligned when in the position of FIG. 6, and horizontally aligned when in the position of FIG. 3.

When moving the tailgate assembly 26 from the position of FIG. 6 to the step position of FIG. 3, the articulation arms 54 may move against flaps 92 of the second gate 34 to provide clearance for the articulation arms 54 to fit within clearance pockets of the second gate 34. The clearance pockets permit the forwardmost portions of the second gate 34 to tuck horizontally beneath the first gate 30 to facilitate ingress and egress. The flaps 92 can be, in some examples, spring biased toward the position of FIG. 6 so that the flaps 92 return to the position of FIG. 6 when the articulation arms 54 are not received within the clearance pockets.

Figure 9A:
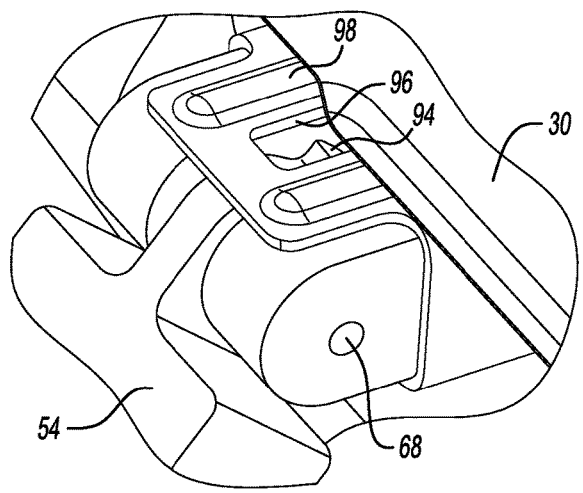
FIG. 9A illustrates a close-up view of a portion of the articulation arm coupled to the first gate through a first pivot at an initial stage of transitioning to the step position of FIG. 3 from the position of FIG. 7.
Figure 9B:
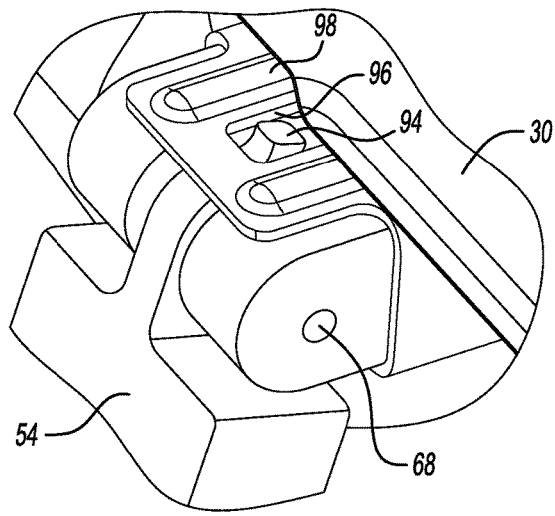
FIG. 9B illustrates the view of FIG. 9A when the tailgate assembly has moved closer to the step position of FIG. 3.
Figure 9C:
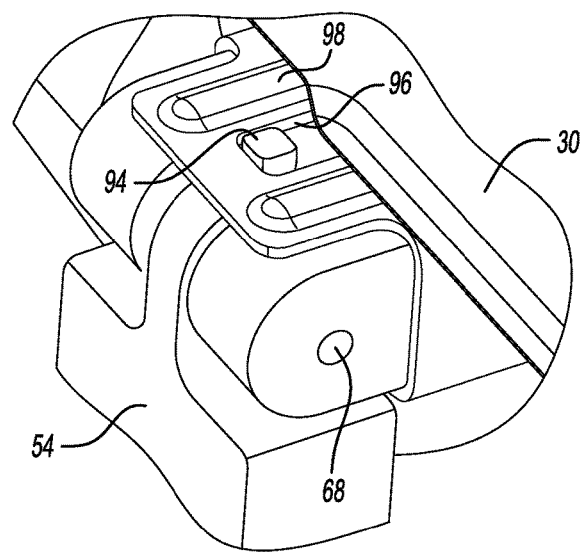
FIG. 9C illustrates the close-up view of FIG. 9A when the tailgate assembly is in the step position of FIG. 3.

Referring to FIGS. 9A-9C, the first end portion 58 of the articulation arm 54 includes a finger 94 that is received within an aperture 96 of a bracket 98 as the articulation arm 54 is pivoted about the first pivot 68 relative to the first gate 30. After sufficient rotation of the articulation arm 54 about the first pivot 68, the finger 94 moves to the position of FIG. 9C where the finger 94 contacts a side of the bracket 98 defining the aperture 96. Contact between the finger 94 and the bracket 98 prevents the articulation arm 54 from overrotating in the direction $D_1$ relative to the first gate 30.

In this exemplary embodiment, the articulation arm 54 extend along a longitudinal axis $L_A$, and the finger 94 is configured to stop rotation of the articulation arm 54 relative to the first gate 30 when the longitudinal axis $L_A$ is substantially vertical.

Notably, the second end portion 72 includes a corresponding finger 102 that contacts an associated bracket within the second gate 34 to block the second gate 34 from overrotating relative to the articulation arm 54 when moving in the direction $D_2$. That is, the structures associated with pivoting the second end portion 72 are similar to the structures associated with pivoting the first end portion 58.

Referring again to FIG. 3, the second gate 34 is coupled to a step assist handle 108 that can be raised from the lowered position of FIG. 2 to the position shown in FIG. 3. The user can grasp the step assist handle 108 when the tailgate assembly 26 is in the step position to assist the user when utilizing the inner surface 42 as the step surface.

When the tailgate assembly 26 is in the step position of FIG. 3, a first cable assembly 112 can be used to couple the first gate 30 to the sidewalls 18 of the truck 10. In this example, ends of the first cable assembly 112 connect to one of the latch pins 88 of the latch assembly 80 (FIG. 5). In particular, a portion of the latch pins 88 extends to an exterior of the first gate 30 to provide connectors for the ends of the first cable assembly 112. Separate pins exclusively used to connect to the first cable assembly 112 are thus not required.

Opposing ends of the first cable assembly 112 can be coupled to respective striker pins 118 extending from the sidewalls 18 of the truck 10. When the second gate 34 is in the closed position, the striker pins 118 can be engaged by a latch mechanism 122 within the second gate 34 to hold the second gate 34 in the closed position (FIG. 1). Separate pins exclusively used to connect the sidewalls 18 to the first cable assembly 112 are thus not required.

The first cable assembly 112 supports the first gate 30 when in the open position of FIG. 3. The first gate 30 may experience relatively high loads when moving cargo to and from the cargo bed area 14, and the first cable assembly 112 can facilitate supporting these loads.

A second cable assembly 126 includes a pair of cables each coupled at one end to the latch pin 88 and coupled at an opposing end to a connector pin 130 of the second gate 34. The second cable assembly 126 helps to support the second gate 34 when the inner surface 42 of the second gate 34 is used as the step surface. As the latch pin 88 is selectively used to couple cables of the first cable assembly 112, to couple cables of the second cable assembly 126, and for latching with the latch assembly 80, the latch pin 88 can be considered a three-function pin.

When the tailgate assembly 26 is in the position of FIG. 2 where both the first gate 30 and the second gate 34 are in the open position, the first cable assembly 112 can be utilized to support the tailgate assembly 26. The first cable assembly 112 is connected between the first gate 30 and the sidewalls 18 like how the first cable assembly 112 is connected in FIG. 3.

When the tailgate assembly 26 is in the extended bed position of FIG. 4 where the first gate 30 is in the open position, the first cable assembly 112 can be utilized to support the tailgate assembly 26. The first cable assembly 112 is connected between the first gate 30 and the sidewalls 18 like how the first cable assembly 112 is connected in FIG. 3.

Further, the second cable assembly 126 can be used to support the second gate 34 when the tailgate assembly 26 is in the extended bed position. In this position, ends of the cables within the second cable assembly 126 are coupled to the sidewalls 18, and the opposing ends of the cables within the second cable assembly 126 are coupled to the connector pins 130.

When not in use, the cables of the second cable assembly 126 can be stored within a respective recess of the tailgate assembly 26, such as recesses within the second gate 34 each coverable with a removable trim plate 136.

Notably, in the extended bed position, the articulation arms 54 of the articulation assembly 50 may be retracted slightly within the first gate 30. This facilitates usage of the same second cable assembly 126 to support the second gate 34 in the extended bed position of FIG. 4 and in the step position of FIG. 3. Further, retracting the articulation assembly 50 slightly within the first gate 30 when in the extended bed position reduces a size of an opening 140 between the first gate 30 and the second gate 34 where cargo carried within the extended cargo bed area could potentially drop through. In this example, when the tailgate assembly 26 is in the extended bed position, the first gate 30 extends the cargo bed 14 rearward by about 14 inches (35.56 centimeters) compared to the cargo bed 14 when the first gate 30 is in the closed position.

Some features of the disclosed examples include a tailgate assembly having a first gate and a second gate where the first gate can be utilized to provide a step surface into a cargo bed. The step surface notably extends across an entire cross-vehicle width of the cargo bed, which provides the user with a relatively large platform to access the cargo bed.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A tailgate assembly, comprising:
a first gate pivotably coupled to a vehicle body; and
a second gate pivotably coupled to the first gate, the second gate having an inner surface that faces a vehicle cargo bed when the second gate is in a closed position, the first and second gates moveable to a step position where the inner surface is a step surface to the vehicle cargo bed, the first gate having an inner surface that is vertically aligned with a plane of the vehicle cargo bed when in the step position.

2. The tailgate assembly of claim 1, wherein each portion of the first gate is vertically displaced from each portion of the second gate when the first and second gates are in the step position.

3. The tailgate assembly of claim 1, wherein the first gate is in an open position when the first and second gates are in the step position.

4. The tailgate assembly of claim 1, further comprising an articulation assembly coupled to the first gate at a first pivot and coupled to the second gate at a second pivot.

5. The tailgate assembly of claim 4, wherein the first pivot is vertically above the second pivot when the first and second gates are in the step position.

6. The tailgate assembly of claim 4, wherein the articulation assembly is configured to pivot relative to the first gate about the first pivot in a first direction to position the second gate in the step position, wherein the second gate is configured to pivot relative to the articulation assembly about the second pivot in a second direction to place the second gate in the step position, the first direction opposite the second direction.

7. The tailgate assembly of claim 6, wherein, when the first gate is in an open position to provide an extended vehicle cargo bed, the articulation assembly is configured to pivot relative to the first gate to a position where the first and the second pivots are substantially vertically aligned, and the second gate is configured to pivot about the second pivot to the closed position to provide a closed tailgate for the extended vehicle cargo bed.

8. The tailgate assembly of claim 7, further comprising a first cable assembly coupling the vehicle body to the first gate in the open position, and a second cable assembly coupling the second gate to the vehicle body when the second gate is providing the closed tailgate for the extend vehicle cargo bed.

9. The tailgate assembly of claim 4, wherein the second gate is slideable between an extended position and a retracted position relative to the first gate.

10. The tailgate assembly of claim 9, wherein an interior area of the first gate, the second gate, or both receives at least some of the articulation assembly when the second gate is in the retracted position.

11. The tailgate assembly of claim 9, further comprising a latch assembly that is selectively actuated to allow the second gate to transition from the retracted position to the extended position.

12. The tailgate assembly of claim 9, wherein the second gate is pivotable to the step position when the second gate is in the extended position, and the second gate is blocked from pivoting when the second gate is in the retracted position.

13. The tailgate assembly of claim 4, wherein the articulation assembly has a longitudinal axis, and the longitudinal axis extends vertically when the first gate and the second gate are in the step position.

14. The tailgate assembly of claim 1, wherein the first gate and the second gate are disposed along horizontal planes when in the step position.

15. The tailgate assembly of claim 1, wherein the step surface extends across an entire width of the vehicle cargo bed and is generally parallel to ground level when the first and second gates are in the step position.

16. A method, comprising:
pivoting a first and a second gate to a step position where an inner surface of the first gate is vertically aligned with a plane of a floor of a vehicle cargo bed, and an inner surface of the second gate is a step surface to the vehicle cargo bed, the inner surface of the second gate facing the vehicle cargo bed when the second gate is in a closed position.

17. The method of claim 16, wherein the first gate is pivotably attached to vehicle body, and the second gate is pivotably attached to the first gate through an articulation assembly.

18. The method of claim 17, further comprising moving the second gate to an extended position relative to the articulation assembly and the first gate prior to pivoting the second gate to the step position, the second gate spaced a distance from the first gate when in the extended position.

19. The method of claim 17, wherein the articulation assembly includes an articulation arm having a first end portion coupled to the first gate through a first pivot, and an opposing, second end portion is coupled to the second gate through a second pivot, and further comprising pivoting the articulation arm about the first pivot relative to the first gate in a first direction when moving the second gate to the step position, and pivoting the second gate about the second pivot relative to the articulation arm in a second direction when moving the second gate to the step position, the first direction opposite the second direction.

20. A method, comprising:
pivoting a first and a second gate to a step position where an inner surface of the second gate is a step surface to a vehicle cargo bed, the inner surface facing the vehicle cargo bed when the second gate is in a closed position; and selectively pivoting the first and second gates to an extended bed position where the first gate is in an open position to provide an extended vehicle cargo bed, and the inner surface of the second gate faces the extended vehicle cargo bed to provide a closed tailgate for the extended vehicle cargo bed.

* * * * *